United States Patent [19]
Persson et al.

[11] Patent Number: 5,394,760
[45] Date of Patent: Mar. 7, 1995

[54] TORQUE SENSOR FOR A POWER ASSIST STEERING SYSTEM

[75] Inventors: Erland K. Persson, Golden Valley, Minn.; Paul K. Webber; David L. Perry, both of Rochester Hills, Mich.

[73] Assignee: TRW Inc., Lyndhurst, Ohio

[21] Appl. No.: 892,760

[22] Filed: Jun. 3, 1992

[51] Int. Cl.6 .............................................. G01L 1/00
[52] U.S. Cl. ...................... 73/862.331; 73/862.325
[58] Field of Search ................ 73/862.331, 862.333, 73/862.339; 324/207.15, 207.17, 207.18, 207.16; 180/79.1, 142; 336/123, 125

[56] References Cited

U.S. PATENT DOCUMENTS

| | | | |
|---|---|---|---|
| 2,397,935 | 4/1946 | Gardiner et al. | 336/123 |
| 2,844,802 | 7/1958 | Tripp et al. | 336/123 |
| 2,964,721 | 12/1960 | Tripp | 336/123 |
| 3,441,886 | 4/1969 | Treter | 336/123 |
| 3,519,969 | 7/1970 | Hoffman | 336/123 |
| 4,173,265 | 11/1979 | Kremer | 180/79.1 |
| 4,637,265 | 1/1987 | Fiori, Jr. | 324/207.16 |
| 4,660,671 | 4/1987 | Behr et al. | |
| 4,682,104 | 7/1987 | Lombard et al. | 324/207.17 |
| 4,805,463 | 2/1989 | Kelledes et al. | 73/862.331 |

Primary Examiner—Richard E. Chilcot, Jr.
Assistant Examiner—R. Biegel
Attorney, Agent, or Firm—Tarolli, Sundheim & Covell

[57] ABSTRACT

A torque sensor for use in a power assist steering system for sensing the applied steering torque between an input shaft and an output shaft wherein said shafts are coaxially aligned with each other and rotatable relative to each other about a common axis. The sensor includes a non-planar rotary input transformer having a stationary primary winding and a rotary secondary winding, both mounted coaxially about a common axis. A transmitter is mounted to the input shaft for rotation therewith and carries, on one axially directed face, a coil set of series connected coils arranged in an annular array about the common axis. A receiver is axially spaced from the transmitter and is mounted on the output shaft for rotation therewith about the common axis. The receiver carries, on an opposing axially directed face, first and second sets of series connected coils each arranged in an annular array about the common axis and with the coil sets being electrically displaced by 90°. First and second non-planar rotary output transformers are provided respectively having first and second axially spaced primary windings coaxially surrounding the axis. The first and second output transformers respectively include first and second stationary secondary windings spaced radially outward from and coaxially surrounding the first and second rotary primary windings.

18 Claims, 3 Drawing Sheets

TORQUE SENSOR FOR A POWER ASSIST STEERING SYSTEM

TECHNICAL FIELD

The present invention is directed to a torque sensor having particular application for use in a power assist steering system, such as including hydraulic power assist or electric power assist.

BACKGROUND OF THE INVENTION

Power assist steering systems may include a rack and pinion gear set. Power assist is accomplished by applying a supplementary rotary force to a steering member. Such systems may be controlled in response to a driver's applied torque to a vehicle's steering wheel.

U.S. Pat. No. 4,660,671 utilizes a DC electric assist motor. The motor includes a rotatable armature encircling a steering member which has a thread convolution portion thereon and a portion having straight cut rack teeth thereon. Rotation of the electric assist motor armature causes linear movement of the steering member to a ball-nut drive arrangement in combination with the thread convolution portion of the steering member. A torque sensing device is coupled to the steering column to sense driver applied input torque to the steering wheel. The torque sensing device uses a magnetic Hall-effect sensor arrangement for sensing relative rotation between the input and output shafts across a torsion bar. An electric control circuit monitors the signal from the torque sensing device and controls the electric assist motor in response thereto.

U.S. Pat. No. 4,682,104 discloses an angular displacement sensor for use in detecting torque in a power assist steering system. The torque sensor includes an input planar rotary transformer which includes a stationary primary winding and a rotary secondary winding. The secondary winding is mounted on one face of an annular disc which is, in turn, mounted on the input shaft for rotation therewith. Axially displaced from the rotary transformer there is provided a pair of sensor or detection discs including a transmitter disc and a receiver disc. The opposing faces of these discs carry identical planar coils with the coils being in the shape of spirally wound sectors coiled alternately in opposing directions and coaxially surrounding the common axis of the input and output shafts. An AC voltage supplied to the primary of the rotary transformer is applied to the planar coils on the transmitter disc. This causes a voltage to be induced in the planar coils mounted on the receiver disc. A single output planar rotary transformer is employed having a primary winding mounted on a disc and coaxially surrounding the output shaft. The output transformer includes a single stationary winding on another disc axially spaced from the primary winding. A single output signal is provided which varies with angular deviation between the input and output shafts.

A problem noted with respect to the torque sensor disclosed in the aforesaid U.S. Pat. No. 4,642,104 is that the output transformer provides a single output signal representative of the angular displacement between the input and output shafts. This is an absolute value signal and is subject to providing erroneous information. Preferably, two output circuits should be employed providing two output signals that are ratiometric wherein as one signal increases in amplitude, the other decreases in amplitude in an equal amount providing a stable null signal condition. However, such a two-output circuit is not practical for a device constructed in accordance with the aforementioned patent which employs multiple planar discs for both the input rotary transformer and the single output rotary transformer. To add an additional output rotary transformer would present practical problems of planar disc spacing tolerances which would limit axial movement of the discs relative to each other.

SUMMARY OF THE INVENTION

The present invention provides a new and improved torque sensor for use in power assist steering systems and which does not employ planar input and output transformers as noted in such prior art as the U.S. Pat. No. 4,682,104.

In accordance with one aspect of the present invention, it is contemplated that a torque sensor be employed for use in a power assist steering system for sensing the applied steering torque between an input shaft and an output shaft wherein the shafts are coaxially aligned and rotatable relative to each other about a common axis.

The torque sensor includes a non-planar rotary input transformer having a stationary primary winding and a rotary secondary winding, both mounted coaxially about a common axis with the secondary winding being spaced radially inward from said primary winding. A rotary transmitter is adapted to be mounted to the input shaft for rotation therewith about the common axis. A coil set of series connected primary coils is arranged in an annular array about the common axis and is carried on an axially directed face of the transmitter and electrically connected to the secondary winding. A rotary receiver is adapted to be mounted to the output shaft for rotation therewith about the common axis. First and second coil sets of series connected coils are each arranged in an annular array about the common axis and are each carried by a face on the receiver and which face axially faces the transmitter. The first and second sets of coils are electrically displaced from each other by 90°. First and second non-planar rotary output transformers are provided with each having a primary winding adapted to be carried by the output shaft for rotation therewith about the common axis. The output transformers respectively include first and second stationary secondary windings associated with first and second rotary primary windings for providing a pair of output signals.

BRIEF DESCRIPTION OF THE DRAWINGS

The foregoing and other objects and advantages of the invention will become more readily apparent from the following description as taken in conjunction with the accompanying drawings, wherein.

DESCRIPTION OF PREFERRED EMBODIMENT

Figure 1:
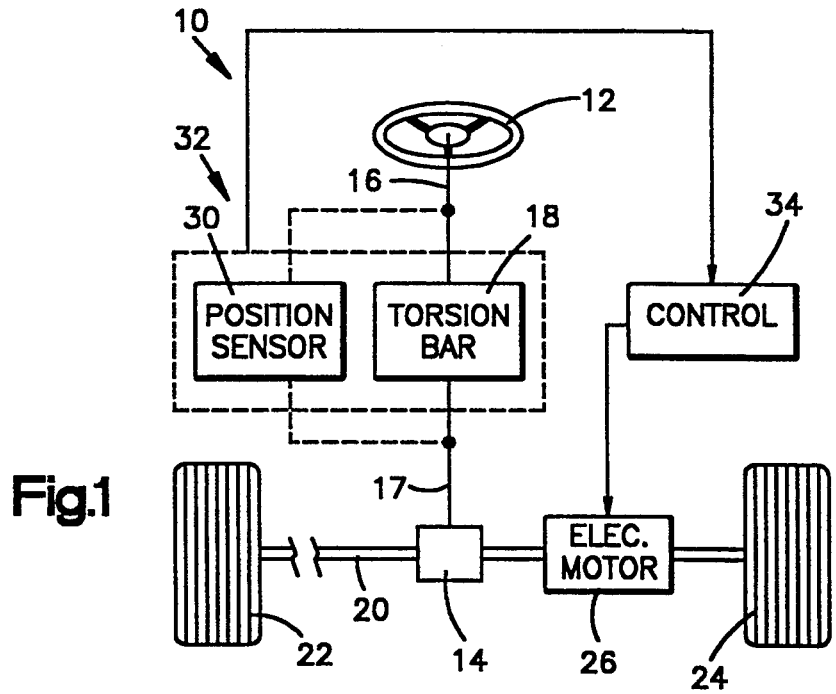
FIG. 1 is a schematic-block diagram illustrating a power assist system which may be employed with the present invention.

Reference is now made to the drawings wherein the showings are for purposes of illustrating a preferred embodiment and not for purposes of limiting same. FIG. 1 illustrates a power assist steering system 10 including a steering wheel 12 operatively connected to a pinion gear 14. The steering wheel 12 is connected to an input shaft 16 and the pinion gear 14 is connected to an output shaft 17. The input shaft 16 is operatively connected to the output shaft 17 through a torsion bar 18. The torsion bar 18 twists in response to applied steering torque thereby permitting relative rotation between the input shaft 16 and the output shaft 17 about a common axis.

The pinion gear 14 has helical teeth which meshingly engage with straight cut teeth along a rack or linear steering member 20. The pinion gear in combination with the straight cut gear teeth on the rack member 20 form a rack and pinion gear set. The rack member 20 is coupled to the vehicle's steerable wheels 22, 24 with steering linkage in a known manner. When the steering wheel 12 is turned, the rack and pinion gear set converts the rotary motion of the steering wheel into a linear motion of the rack member. When the rack member moves linearly, the steerable wheels 22, 24 pivot about their associated steering axes and the vehicle is steered.

An electric assist motor 26 is drivingly connected to the rack member 20. When the electric motor 26 is energized, it provides power assist steering so as to aid in the rotation of the vehicle steering wheel by the vehicle operator. A position sensor 30 is operatively connected across the input shaft 16 and the output shaft 17 and provides an electrical signal having a value representative of the relative rotational position between the input shaft and the output shaft. The position sensor 30 in combination with the torsion bar 18 form a torque sensor 32. The output of the sensor is indicative of the applied steering torque to the vehicle steering wheel by the vehicle operator. The output from the sensor 32 is supplied to a control circuit 34 which processes the torque signal and separates it into a directional signal and a magnitude signal and utilizes these signals for controlling the electric motor 26.

Figure 2:
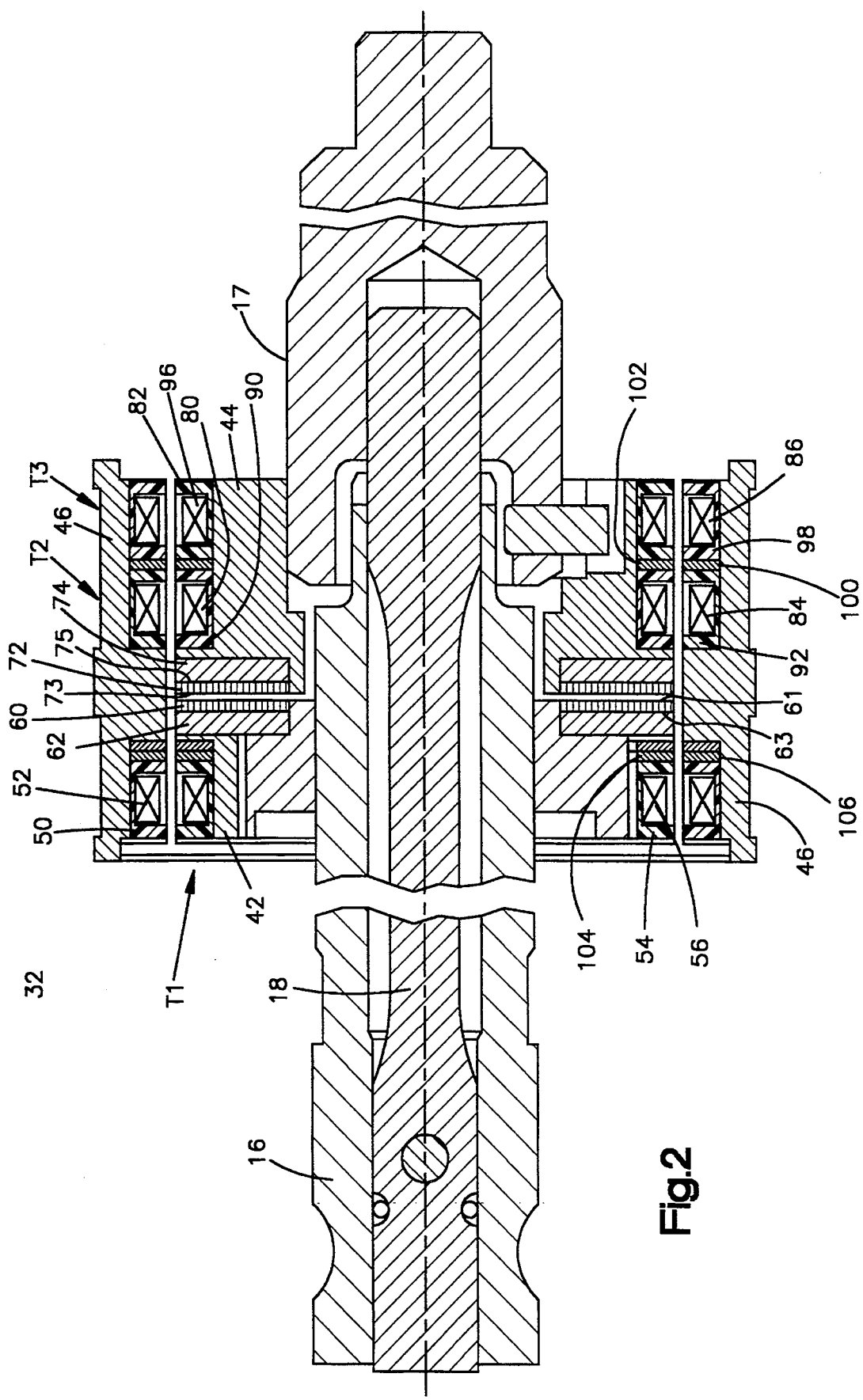
FIG. 2 is a sectional view illustrating one embodiment of the invention.

Reference is now made to FIG. 2 which illustrates the torque sensor 32 in greater detail. The torque sensor 32 includes a torsion bar 18 which interconnects the steering wheel input shaft 16 with a pinion gear output shaft 17 in a known manner, such as described in U.S. Pat. No. 4,660,671 discussed hereinbefore.

Referring now to FIG. 2, an annular input rotor 42 coaxially surrounds and is suitable mounted to the input shaft 16 for rotation therewith. Axially spaced from input rotor 42 there is provided an annular output rotor 44 which coaxially surrounds and is suitably mounted to the output shaft 17 for rotation therewith about the common axis of rotation of the shafts 16 and 17. The input rotor 42 and the output rotor 44 are angularly movable relative to each other about the common axis of rotation. Torsion applied to the torsion rod 18 will result in relative angular rotation and it is the extent of this rotation that is to be measured by the torque sensor described herein.

The rotors 42 and 44 are coaxially surrounded by a stationary stator 46. The rotors 42 and 44 and the stator 46 may be constructed of metal, such as aluminum, or plastic. In any event, the rotors 42 and 44 and the stator 46 are not part of the magnetic circuit employed for sensing relative angular rotation between the rotors.

Figure 3:
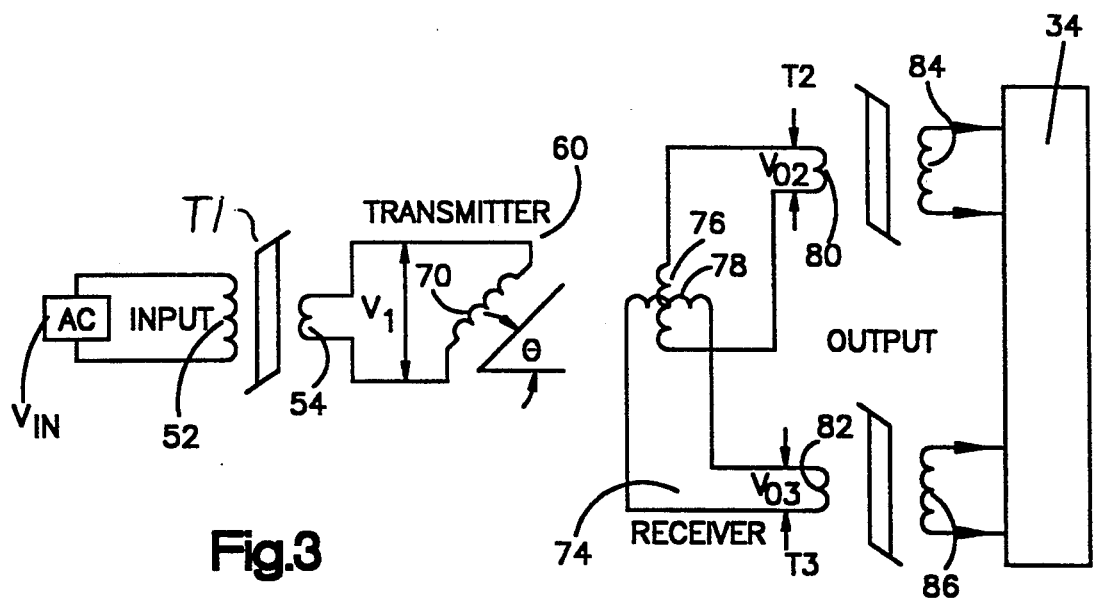
FIG. 3 is a combined schematic-block diagram illustration of the electric circuitry employed herein.

Before describing FIG. 2 in further detail, attention is briefly directed to the circuitry of FIG. 3. The circuitry includes a rotary input transformer T1 having a stationary primary winding connected to an AC input voltage $V_{IN}$ and a rotary secondary winding. As will be brought out hereinafter, the rotary secondary winding coaxially surrounds and rotates with the input shaft 16 about the common axis. The secondary winding is electrically connected to a transmitter coil which is axially spaced therefrom and which also rotates with the input shaft 16 about the common axis of rotation. A pair of receiver coils are electrically displaced 90° from each other. These coils are axially spaced from the transmitter coil and coaxially surround and rotate with the output shaft 17. The receiver coils are respectively connected to the primary windings of output rotary transformers T2 and T3. The primary windings of transformers T2 and T3 also coaxially surround and rotate with the output shaft 17. The secondary windings of transformers T2 and T3 are stationary and provide a pair of output signals which are applied to the control circuit 34 for controlling the electric motor 26, all to be described in greater detail hereinafter.

As shown in FIG. 2, the stator 46 carries an annular transformer core 50 which coaxially surrounds and is spaced from the input rotor 42. As viewed in FIG. 2, core 50 is U-shaped in cross section providing an annular channel for receiving and carrying a primary winding 52. The winding 52 is carried by the transformer core so as to coaxially surround the rotor 42.

Spaced radially inwardly across an air gap there is provided an annular transformer core 54 which is carried by the rotor 42. Core 54 has a U-shaped channel provided therein facing radially outward toward transformer core 50. The U-shaped channel in transformer core 54 carries a secondary winding 56 so that the winding coaxially surrounds rotor 42 and is rotatable with the rotor about the common axis. As described, the transformer core 50 and its primary winding 52 form the stationary portion of a transformer T1 and the transformer core 54 with its winding 56 form the rotary portion of the rotary transformer T1. The transformer cores 52 and 54 are preferably constructed of a permeable magnetic material or the like to confine the magnetic circuit to the transformer cores which immediately surround the primary winding 52 and the secondary winding 56.

The transmitter 60 is illustrated in FIG. 2 as including a disc having opposing faces 61 and 63 and which coaxially surrounds and is mounted to a rotor 42 for rotation therewith about the common axis. Immediately to the left, as viewed in FIG. 2, the transmitter 60 is provided with an annular backing plate 62 which is used for confining the sensor flux path to be described in greater detail hereinafter. The backing plate 62 and the transformer cores herein are of magnetically permeable material and may be constructed of powdered iron or ferrite filled plastic or soft ferrite. The transmitter 60 includes a coil set 70, to be described in greater detail hereinafter with reference to FIG. 5. The coil set 70 has plural coils which are connected together in series across the secondary winding 54 of the rotary transformer T1 (the interconnection between winding 54 and coil set 70 is not illustrated in FIG. 2 for clarity).

Axially spaced from transmitter 60 there is provided a receiver 72. This is an annular disc having opposing faces 73 and 75 and which is carried by the rotor 44 and rotates therewith about the common axis. As in the case of transmitter 60, the receiver 72 has associated therewith a backing plate 74 which is also mounted to the rotor 44 and rotates therewith about the common axis. The plate 74, like plate 62, is an annular plate and may be constructed of the same material as that discussed hereinbefore with reference to backing plate 62. The receiver 72 carries two sets of receiver coils 76 and 78. These will be described in greater detail hereinafter with reference to FIGS. 5 and 6. The coil set 76 includes a plurality of coils which are connected together in series. Similarly, coil set 78 includes a plurality of coils which are connected together in series. Coil set 78 is electrically displaced from coil set 76 by 90° (see FIG. 3). Coil set 76 is connected across the primary winding 80 of rotary output transformer T2 whereas coil set 78 is connected across primary winding 82 of rotary output transformer T3 (see FIG. 3). The secondary winding 84 of transformer T2 and the secondary winding 86 of transformer T3 are connected to the control circuit 34. Plates 62 and 74 serve to confine the flux paths to the magnetic circuit associated with the coil sets mounted on the discs, the backing plates and the air gaps between the coil sets. The backing plates provide a high permeable magnetic return path for the flux from one pole to the next. Except for the air gap, the flux is confined and contained by the backing plates.

As shown in FIG. 2, the transformer T2 has its primary circuit carried by the rotor 44. Thus, a transformer core 90 is carried by output rotor 44 for rotation therewith about the common axis. The transformer core 90 is U-shaped in cross section providing an annular channel which coaxially surrounds the common axis. The channel receives the primary winding 80 of the transformer T2. The secondary side of transformer T2 is carried by the stationary stator 46. This includes an annular transformer core 92 which is radially spaced from and coaxially surrounds the rotor 44. The transformer core 92 is U-shaped in cross section defining a channel which faces toward the rotor and which carries the stationary secondary winding 84 of the transformer T2. Thus, the secondary winding 84 is radially spaced from and coaxially surrounds the primary winding 80 on the transformer core 90.

Transformer T3 has its primary circuit carried by the output rotor 44. This includes a transformer core 96 which takes the form of an annular member coaxially surrounding and suitably mounted to the output rotor 44 for rotation therewith about the common axis. The transformer core 96 is U-shaped in cross section providing an annular channel which receives the primary winding 82 so that this winding coaxially surrounds rotor 44 for rotation therewith about the common axis.

The secondary circuit of the transformer T3 is carried by the stationary stator housing 46. This includes a transformer core 98. This is an annular member which coaxially surrounds and is radially spaced outward from rotor 44 and is secured to the stator housing 46. As shown in FIG. 2, the transformer core 98 is U-shaped in cross section and defines an annular channel facing toward rotor 44. This channel carries the secondary winding 86 so that this winding coaxially surrounds and is radially spaced from the primary winding 82 of this transformer.

An annular shield 100 axially separates the rotary transformer cores 92 and 98 from each other to minimize cross talk between the secondary windings of transformers T2 and T3. Similarly, an annular shield 102 separates the rotary transformer cores 90 and 96 from each other to minimize cross talk between the primary and secondary windings of transformers T2 and T3. The metal shields 100 and 102 may be constructed from cold rolled steel, for example.

A pair of adjacent annular shields 104 separate the rotor transformer core 54 from the backing plate 62 to minimize stray leakage at the transformer from reaching the magnetic circuit of the transmitter 60. Similarly, a pair of annular shields 106 separate the stator transformer core 50 from the stator housing as well as from the magnetic circuit of the transmitter 60. These shields may be constructed from cold rolled steel, for example.

Figure 5:
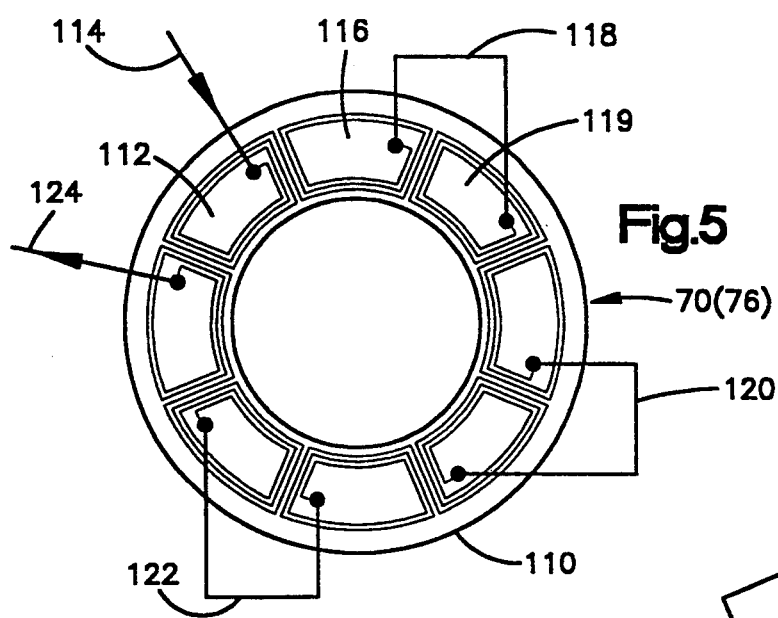
FIG. 5 is a view of the front face of a disc carrying an annular array of coils.

The transmitter 60 and the receiver 72 are constructed similar to each and will now be described with reference to FIGS. 5 and 6. FIG. 5 illustrates an annular disc 110 which is constructed of a suitable electrical insulator material. On one face of this disc there is provided a coil set 70 arranged in an annular array of flat coils in the form of copper traces. As shown in FIG. 5, there are provided eight poles of alternating three-turn and two-turn patterns of metal traces forming the coil set 70. That is, the coil set includes a first three-turn spiral pattern 112 wound in a clockwise direction starting from an input conductor 114 and extending to a second spiral pattern 116 which is a two-turn pattern wound in the opposite or counterclockwise direction. Pattern 116 is, in turn, electrically connected by a connecting conductor 118 to a third pattern 119 which, like pattern 114, is a three-turn pattern in a clockwise direction. These patterns continue, alternating between clockwise and counterclockwise patterns, with the patterns being connected together in series as with connecting conductors 118, 120 and 122 and terminating in output conductor 124. It is to be noted that the input conductor 114 and the interconnecting conductors 118, 120 and 122 and the output conductor 124 are shown in FIG. 5 for purposes of explanation. In a preferred embodiment, the connecting conductors 118, 120, 122, would be embedded within the insulator disc 110 and the input conductor 114 would take the form of a conductor pad and the output conductor 124 would also take the form of a conductor pad with the pads being located adjacent the periphery of the disc 110, in a known manner.

Figure 6:
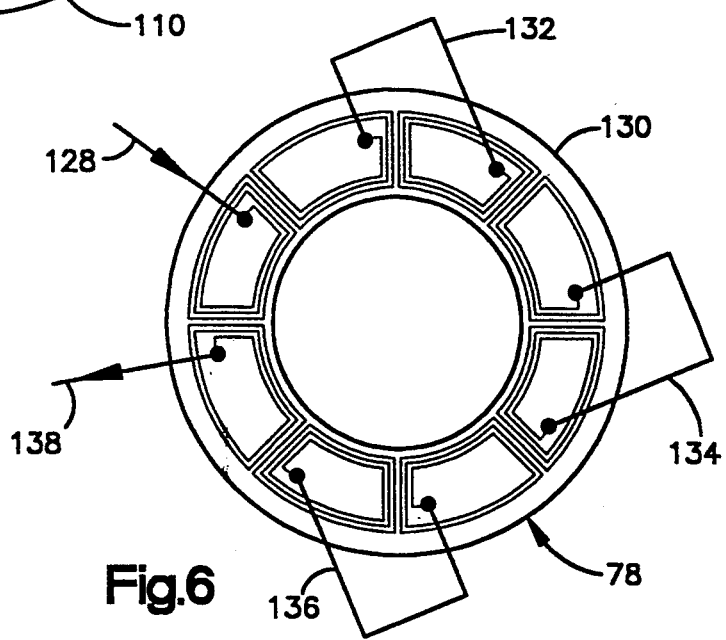
FIG. 6 is a view of the front face of another disc carrying another annular array of coils.

Reference is now made to FIG. 6 which illustrates another insulator disc 130 similar to that of disc 110 in FIG. 5. Disc 130 in a manner similar to that of disc 110 carries on one face thereof a set of coils 78 arranged in an annular array with the coils being connected together in series in a manner essentially identical to that of the coils in FIG. 5. Thus, the coils in FIG. 6, like those in FIG. 5 are interconnected in a series circuit with conductors 132, 134 and 136 which, in a preferred version, are embedded within the insulator disc 130. Also, the series connected coils are provided with an input conductor 128 and an output conductor 138. It is to be noted that the coils in FIG. 6 are identical to that of FIG. 5 but are rotated in a counterclockwise direction by a mechanical angle of 22.5° (which for an eight-pole configuration as shown is a rotation of 90 electrical degrees).

The transmitter 60 includes a disc 110 with the coils 70 as described in FIG. 5. This disc 110 may be directly mounted to the rotor 42 for rotation therewith or may be secured as with a suitable bonding material to the backing plate 62 so that the transmitter 60 is mounted for rotation about the common axis of shafts 16 and 17. The coils on the transmitter face toward the receiver 72.

The opposing face of the receiver 72 carries a first set of coils 76 and a second set of coils 78 (see FIG. 3). Coils 76 are identical to that as shown in FIG. 5 and are mounted on an insulator, such as insulator disc 110. On the receiver 72, the disc 110 overlies that of disc 130 which carries the coil set 78. This forms a two-layer structure including insulator discs 110 and 130 with the conductive tracings forming coil set 76 located between the insulator discs and thereby electrically insulated from coil set 78 carried on receiver disc 130. Thus, the receiver 72 is comprised of a sandwich structure corresponding with a disc 110 of FIG. 5 overlying a disc 130 of FIG. 6. The receiver coil sets 76 and 78 are electrically spaced by 90° (22.5 mechanical degrees).

The transmitter and receiver coil sets have 8 poles of alternating three-turn and two-turn patterns as is seen in FIGS. 5 and 6. The conductor patterns have been made such that the conductors themselves do not occupy a large segment of the available space. By keeping the conductor patterns relatively narrow, a transfer function has been achieved (output voltage versus angular change between the two disks) which is essentially linear over the desired mechanical angle of plus and minus 4°.

Referring to FIG. 3, the input $V_1$ and output $V_{o2}$, $V_{o3}$ voltages are shown. An excitation voltage into the transmitter section is:

$$V_1 = A \sin \omega t \quad (1)$$

Where A is a constant and wherein $\omega t$ is the frequency of excitation, typically 200 kHz. FIG. 3 shows the transmitter coil set 70 at an electromechanical angle $\theta$ with respect to the receiver coil sets 76 and 78. $\theta$ is the angle of electromechanical alignment between the two disks, where 360° of $\theta$ represents 2/P of a revolution of the disks, where P is the number of poles. Thus, one electromechanical "revolution" is equal to 90 mechanical degrees. The output pattern of the voltage signals versus relative disk rotation repeats itself four times per one mechanical revolution. This fact represents an amplified sensitivity of the sensor transfer function of output voltage amplitude versus mechanical rotation.

Since the conductor pattern has relatively narrow conductor paths and relatively larger coil areas, the inductive coupling between transmitter coil set 70, and receiver coil sets 76 and 78 is linearly proportional to the electromechanical angle $\theta$ over a limited range, where the conductors do not overlap each other.

The conductor pattern of coil sets 76 and 78 is oriented 90 electric degrees from each other, as shown in FIG. 3. When coil set 70 is in complete alignment with coil set 76, the output voltage $V_{o2}$ is at a maximum, and voltage $V_{o3}$ is at zero.

Figure 4:
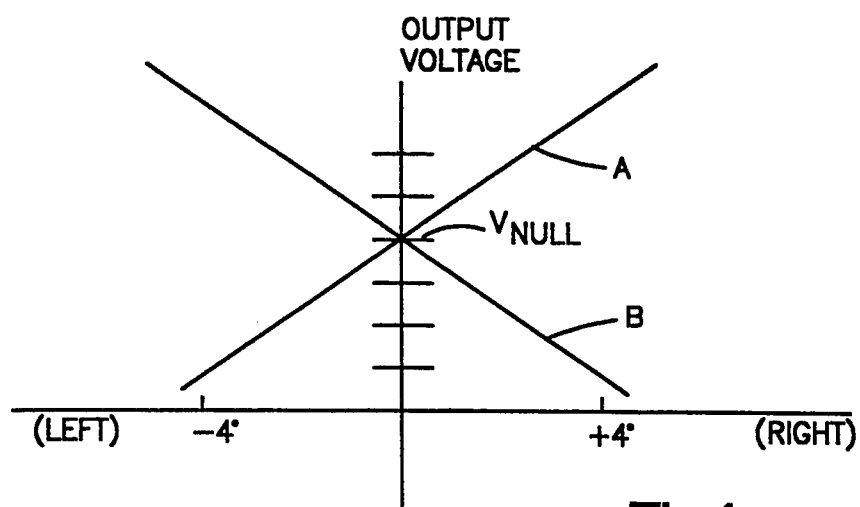
FIG. 4 is graphical representation of the output signals from the torque sensor versus the degree of relative rotation between the input shaft and the output shaft.

The sensor is designed to operate over an angle of plus and minus 4 mechanical degrees (see FIG. 4). Since the sensor has 8 poles, this means that the operational range at the electromechanical level is P/2 times (4 times) larger. Thus, the operational range is plus and minus 16 electromechanical degrees.

The electrical equation for the receiver output is: for coil set 76:

$$V_{o2} = \beta(\sin\omega t)\theta \text{ for } 29° < \theta < 61° \quad (2)$$

for coil set 78:

$$V_{o3} = \beta(\sin\omega t)(90-\theta) \text{ for } 29° < \theta < 61° \quad (3)$$

B is a constant.

The operational "null" position of the device is at $\theta = 45°$, where both $V_{o2}$ and $V_{o3}$ amplitudes are equal. However, the amplitudes will vary in opposite directions with a change in $\theta$ from the 45° position.

Referring now to FIG. 4, there is shown a graphical illustration of voltage with respect to degrees of relative rotation and showing curves A and B. Curve A may be considered as a curve connecting plotted points representing peak-to-peak values of the output voltage $V_{o2}$ as the steering wheel is rotated. Curve B represents similar peak-to-peak voltage values of the output voltage $V_{o3}$. The two curves A and B intersect at a voltage level $V_{null}$ where the output voltages $V_{o2}$ and $V_{o3}$ are equal. In the example presented, the maximum value of $V_{o2}$ or $V_{o3}$ is on the order of 1.4 volts and the value of $V_{null}$ may be on the order of 1.0 volts. The curves of FIG. 4 show that the relationship between the output voltages is such that as the amplitude of one signal increases, the other decreases in a like amount. Thus, the two signals are ratiometric, rather than absolute and disturbances which affect one signal would affect each in the same manner, so that the ratio between the two signals will always be the same for a given torque output. The system is therefore relatively immune from disturbances such as from axial movement between the two discs.

In summation, a torque sensor is provided for use in a power assist steering system. The torque sensor senses the applied steering torque between a pair of coaxially aligned input and output shafts by measuring the relative angular rotation of the shafts about their common axis. The torque sensor includes a non-planar rotary input transformer T1 which has a stationary primary winding 52 and a rotary secondary winding 56 with the winding 56 being spaced radially inward from that of winding 52. A rotary transmitter 60 is mounted to the input shaft for rotation about the common axis. The transmitter carries a coil set 70 of series connected coils which are arranged in an annular array about the common axis. The coil set 70 is carried on an axially directed face of the transmitter 72. The coil set 70 is electrically connected to the secondary winding 54 of the transformer T1 for receiving an AC input signal therefrom. The rotary receiver 74 is axially spaced from the transmitter 60 and is mounted to the output shaft 17 for rotation therewith about the common axis. The receiver has an axially directed face extending toward that of the transmitter face. The receiver face carries first and second coil sets 76 and 78. Each of these coil sets includes a plurality of coils which are connected together in series and arranged in an annular array about the common axis. These sets of coil sets are electrically displaced by 90° and are electromagnetically coupled to the transmitter to provide first and second output signals across the respective coil sets. These output signals are ratiometric in that as one increases in magnitude the other decreases in magnitude by a like amount. First and second non-planar rotary output transformers T2 and T3 are each provided with a primary winding.

These primary windings are electrically connected to respective ones of the receiver coil sets and coaxially surround and are carried by the output rotor for rotation therewith about the common axis. These rotary primary windings are transformer coupled to a pair of stationary secondary windings which provide a pair of output signals to the control circuit 34. The secondary windings 84 and 86 are spaced radially outward from and coaxially surround the primary windings 80 and 82.

Although the invention has been described in conjunction with a preferred embodiment, it is to be appreciated that various modifications may be made without departing from the spirit and scope of the invention as defined by the appended claims.

Having described the invention, the following is claimed:

1. A torque sensor for use in a power assist steering system for sensing the applied torque between an input shaft and an output shaft wherein said shafts are coaxially aligned with each other and rotatable relative to each other about an axis of rotation, said sensor including:

rotary input transformer having a stationary primary winding and a rotary secondary winding, both arranged coaxially about said axis with said secondary winding being spaced radially inward from said primary winding;

a rotary transmitter having an axially directed transmitter first face and said transmitter being adapted to be driven by the input shaft for rotation therewith about said axis, a coil set including a plurality of series connected coils arranged in an annular array about said axis on said axially directed transmitter first face of said transmitter and electrically connected to said secondary winding for receiving an input signal therefrom;

a rotary receiver axially spaced from said transmitter and adapted to be driven by said output shaft for rotation therewith about said axis, said receiver having an axially directed receiver first face facing toward said transmitter first face, first and second coil sets with each set including a plurality of series connected coils mounted on said receiver first face, each of said receiver coil sets being arranged in an annular array about said axis, said first and second receiver coil sets being electrically displaced by 90° from each other and electromagnetically coupled to said transmitter coil set so as to develop first and second output signals; and first and second rotary output transformers having first and second axially spaced primary windings electrically connected to said first and second receiver coil sets and coaxially surrounding said axis and said first and second primary windings being adapted to be driven by said output shaft for rotation therewith about said axis, said first and second output transformers including first and second stationary secondary windings spaced radially outward from and coaxially surrounding said first and second rotary primary windings.

2. A torque sensor as set forth in claim 1 wherein said transmitter has an axially directed transmitter second face extending axially in a direction away from said transmitter coil set, and a backing plate of magnetic material located adjacent to said second face of said transmitter.

3. A torque sensor as set forth in claim 2 wherein said backing plate is annular and coaxially surrounds said axis.

4. A torque sensor as set forth in claim 3 wherein said backing plate is mounted for rotation with said transmitter about said axis.

5. A torque sensor as set forth in claim 4, wherein said backing plate is of powdered ferrite metal.

6. A torque sensor as set forth in claim 5 wherein said backing plate is of ferrite filled plastic.

7. A torque sensor as set forth in claim 5 wherein said backing plate is of soft ferrite.

8. A torque sensor as set forth in claim 1 wherein said receiver has an axially directed receiver second face extending axially in a direction away from said receiver coil set, and a backing plate of magnetic material located adjacent said second face of said receiver.

9. A torque sensor as set forth in claim 8 wherein said backing plate is annular and coaxially surrounds said axis.

10. A torque sensor as set forth in claim 9 wherein said backing plate is mounted for rotation with said receiver about said axis.

11. A torque sensor as set forth in claim 10 wherein said backing plate is of powdered ferrite metal.

12. A torque sensor as set forth in claim 10 wherein said backing plate is of ferrite filled plastic.

13. A torque sensor as set forth in claim 10 wherein said backing plate is of soft ferrite.

14. A torque sensor as set forth in claim 1 including shielding means interposed between said rotary secondary winding and said rotary transmitter for preventing stray magnetic leakage from the former reaching the latter.

15. A torque sensor as set forth in claim 1 including shielding means interposed between said first and second primary windings of said first and second rotary output transformers for preventing cross talk between the magnetic circuits thereof.

16. A torque sensor as set forth in claim 15 wherein said shielding means includes an annular ring located intermediate said first and second primary windings and with said ring coaxially surrounding and being rotatable about said axis.

17. A torque sensor as set forth in claim 1 including magnetic shielding means interposed between said first and second stationary secondary windings of said first and second output transformers for minimizing cross talk therebetween.

18. A torque sensor as set forth in claim 17 wherein said shielding means includes an annular ring interposed between said first and second secondary windings and mounted for rotation therewith about said axis of rotation.

* * * * *